Sept. 29, 1942.    W. MÖBIUS ET AL    2,297,422
SHIFTING DEVICE FOR STEPPED GEAR DRIVES
Filed Dec. 26, 1939    4 Sheets-Sheet 1
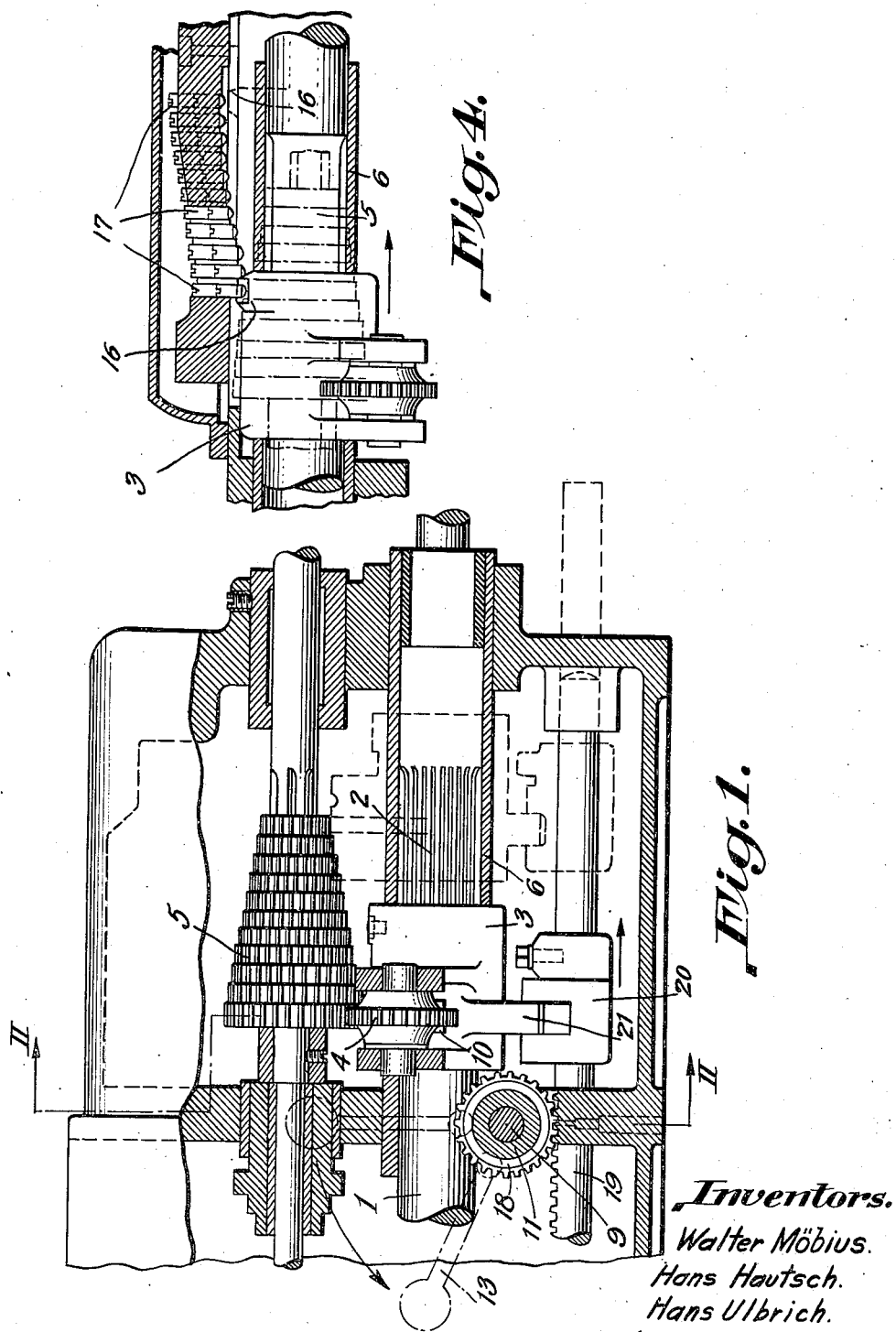
Inventors.
Walter Möbius.
Hans Hautsch.
Hans Ulbrich.
By Bailey, Stephens & Huettig
Attys.

Sept. 29, 1942.   W. MÖBIUS ET AL   2,297,422
SHIFTING DEVICE FOR STEPPED GEAR DRIVES
Filed Dec. 26, 1939   4 Sheets-Sheet 2
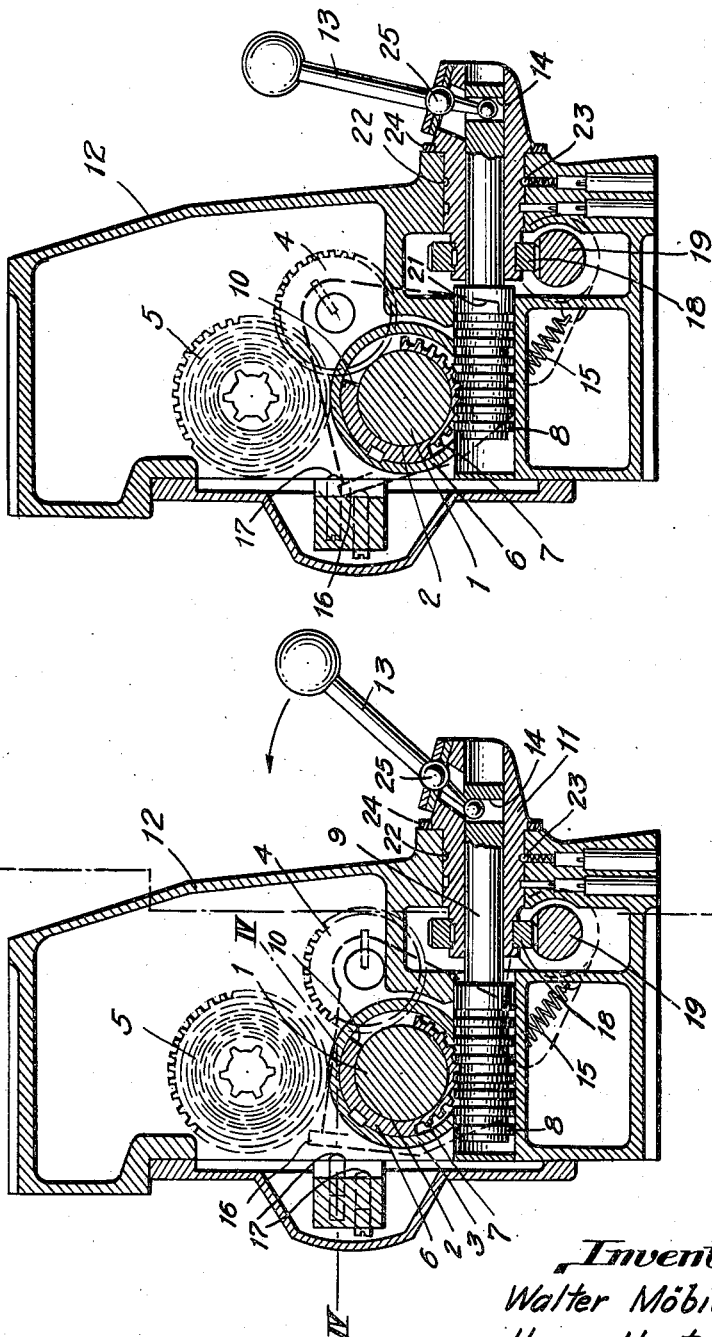
Inventors.
Walter Möbius.
Hans Hautsch.
Hans Ulbrich.
By Bailey, Stephens & Huettig
Attys.

Sept. 29, 1942.    W. MÖBIUS ET AL    2,297,422
SHIFTING DEVICE FOR STEPPED GEAR DRIVES
Filed Dec. 26, 1939    4 Sheets-Sheet 3

Inventors.
Walter Mobius.
Hans Hautsch.
Hans Ulbrich.
By Bailey, Stephens & Huettig
Attys.

Sept. 29, 1942. W. MÖBIUS ET AL 2,297,422
SHIFTING DEVICE FOR STEPPED GEAR DRIVES
Filed Dec. 26, 1939 4 Sheets-Sheet 4

Inventors.
Walter Möbius.
Hans Hautsch.
Hans Ulbrich.
BY Bailey, Stephens & Huettig
Attys.

Patented Sept. 29, 1942

2,297,422

UNITED STATES PATENT OFFICE 2,297,422

SHIFTING DEVICE FOR STEPPED GEAR DRIVES

Walter Möbius, Hans Hautsch, and Hans Ulbrich, Magdeburg, Germany; vested in the Alien Property Custodian Application December 26, 1939, Serial No. 311,048
In Germany December 24, 1938

3 Claims. (Cl. 74—348)

(Granted under the provisions of sec. 14, act of March 2, 1927; 357 O. G. 5)

This invention relates to stepped gear drives operated with a certain drive speed and provided with a number of drive steps, which permit the selection of a corresponding number of different delivered speeds. In many cases the gradation of the operating speed is also employed on power engine plants as well as on working machines, such as machine tools, which may be provided with such multi-stepped change speed gearing inserted between the main drive shaft and the operating shaft. Previously, the shifting to a different speed of such a gear drive was accomplished with the aid of a swinging member carrying a gear, which was in continuous engagement with the drive shaft and which was manually brought into engagement with the selected gear of the stepped gear drive by a swinging movement and displacement of the swinging member. The operator needs both hands to handle such a swinging member thus making its operation very impracticable. In addition, a stepped gear drive of such a construction cannot be arranged in a completely closed housing.

The purpose of the invention is, to arrange the shifting means of the drive in such a manner, that the disadvantages of the former constructions will be eliminated. The invention is based on the idea to direct in two directions the motions of a swinging member carrying a gear which connects the drive shaft and the operating shaft, whereby the actual swing motion is directed into the direction of the drive shaft or the operating shaft and a second motion is directed into a displacement rectangular to the aforesaid motion; this displacement being utilized to bring the gear in engagement with the selected gear of the stepped gear drive. According to the invention separate drive members are provided for the two motions, however both drive members are operated by a single shift member, whereby the shift member likewise is capable of several motions, i. e. an oscillatory motion and a rotary motion. According to the invention drive means for the oscillation and drive means for the displacement of the swing member are provided, said means acting upon said swing member, which supports the transmission gear; both groups of said drive means are actuated by a single shift member. This makes it possible to shift in a simple manner to any of the different gear drive steps. According to the invention the entire gear drive can be arranged in a completely closed housing, which protects the running parts against the intrusion of foreign matter, particularly metal chips, and in addition the entire arrangement of moving parts can run in an oil bath. Instead of an oil bath the mechanism may be lubricated in any other suitable manner.

Another object of the invention is the insertion of a special drive, which imparts an additional oscillatory motion to the swinging member carrying the transmission gear, during its longitudinal displacement; the extent of this motion corresponds to the difference of distance between the pitch circles of the gear steps, depending upon the form of the steps of the gear drive unit. The shift member of the mechanism is connected with the rotary part of a worm drive or a similar cycloidal drive, the axial part of which is an element of the oscillatory drive of the swinging member. The pitch of the worm drive or the cycloidal drive is such that the shift member oscillates in one plane during the longitudinal displacement of the swing member. The part of the oscillatory drive which moves in an axial direction is connected with the shift member by a threaded sleeve, which connects the shift member with the oscillatory drive during the engaging and disengaging motion of the swing member.

This additional drive, which may consist of a sliding pin drive or a similar motion-transmitting arrangement, makes it possible that the oscillatory motions of the hand lever take place in one plane. The automatic locking of the additional shift drive and the securing of the shift lever in its rest support prevents the transmission gear of being forced out of its position by the pressure of the gear teeth in the wrong direction. Furthermore the invention includes some construction details of this novel shifting device which are pointed out in the following description.

Another object of the invention is to construct the shifting device so that the shifting motion during the operation of the gear drive will be simplified and uniform. According to the invention this is accomplished in that the shift member, which imparts an additional oscillatory motion to the swing member is pivotally connected with the member of the mechanism, which displaces the swing member in a longitudinal direction. This shift member consists of two movably connected parts, one of which carries the hand lever and locking means; during the swing motion these means are brought in engagement or disengagement with one of the different notches or the like which correspond with the different shifting positions of the stepped gear drive. The part of the shift member which carries the locking means contacts another part of the shift member which is connected with the part of the mechanism that causes an additional oscillatory motion; an energy storer is inserted between both parts tending to hold the locking means in its engaging position. The object of this construction according to the invention is, that only one swing motion is needed during the shifting of the hand lever of the gear drive, whereby this motion causes the unlocking of the locking means and following the oscillatory displacement of the swing member carrying the transmission gear. The swing motion of the hand lever is followed by a rotary movement of the lever in a direction rectangular to the first motion and causes a longitudinal displacement of the swing member. Only a swing motion and a rotary motion with the hand lever is necessary during the shifting of the gear drive thus simplifying considerably the shifting manipulations.

In order to fully illustrate the invention there are, by way of example, three embodiments pointed out in the present application and shown on the drawings in which:

Fig. 1 is a central vertical cross-section of one embodiment of the device.

Fig. 2 is a section on line II—II of Fig. 1 showing the different parts in a certain position.

Fig. 3 is a similar view as Fig. 2 showing the different parts in another position.

Fig. 4 is a view partly in section taken on the broken line IV—IV of Fig. 2.

Figure 5:
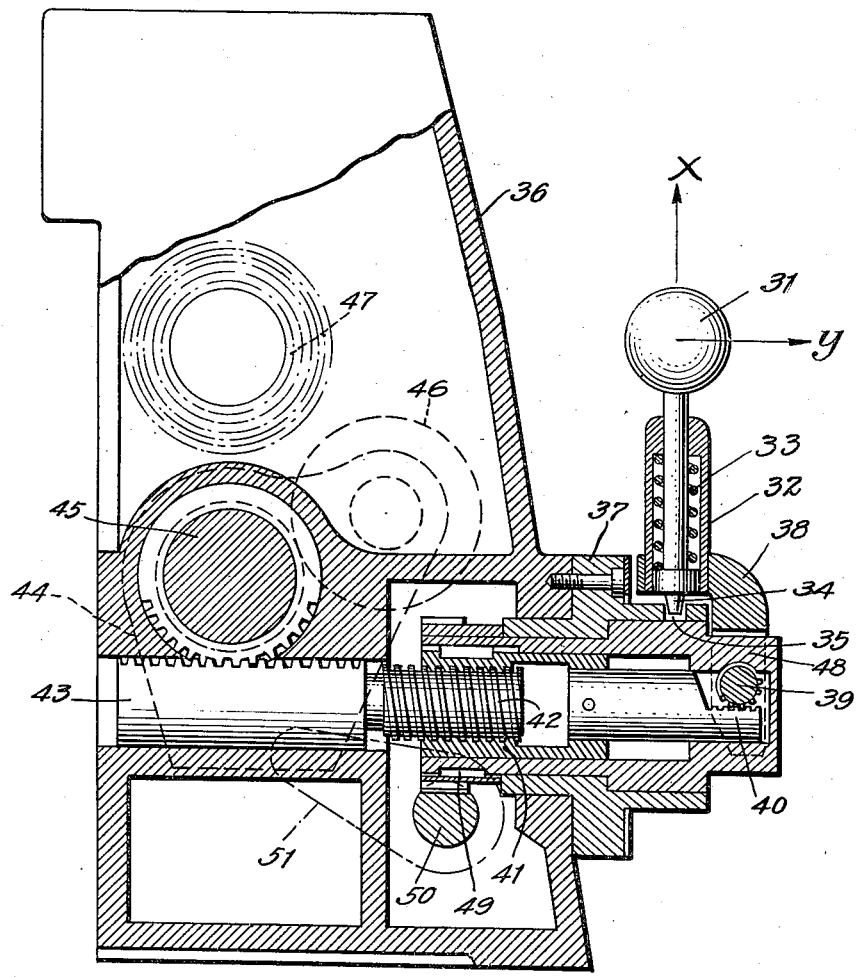
Fig. 5 shows a cross-section of the second embodiment.

As shown on the drawings the shaft 1 shall illustrate the main drive shaft of a lathe. A part of the shaft is to a certain length provided with gear teeth 2. An oscillating frame 3 is arranged on a sleeve 6 surrounding the shaft 1. This swing frame 3 supports a gear 4 which is in engagement with the gear teeth 2 of the shaft 1 about which this frame 3 may swing. The gear 4 is provided for engagement with any one of gears of a cone gear arrangement, a so-called Norton block. The swing frame 3 can be displaced on the sleeve in a longitudinal direction but cannot turn about this sleeve; therefore the swing member 3 is capable of oscillatory movement about the axis of the shaft 1 and longitudinal displacement with respect to said shaft.

The sleeve 6 carries a gear segment 7 which engages the gear teeth 8 provided on a push rod 9. The sleeve 6 has a window 10 (Figs. 2 and 3) which is arranged in such a manner that the gear 4 is able to engage the gear teeth 2 of the shaft 1. The push rod 9 is supported by a sleeve 11, which is arranged in and extending over the bore of a boss of the housing 12 which encloses the entire gear drive; the push rod 9 is capable of being displaced in a longitudinal direction within the sleeve 11, while the sleeve 11 is able to turn about its axis. The outer end of the sleeve 11 has a handle-like shape and supports a shift member in the form of a hand lever 13. The lower ball-shaped end of the lever 13 engages a slot 14 of the push rod 9. If the lever 13 is swung as indicated in Figs. 2 and 3 the push rod 9 is displaced within the sleeve 11 causing the swing frame 3 to be oscillated by means of the engagement between gear teeth 7 with the gear segment 8, whereby the gear 4 is either engaged with or disengaged from one of the gear steps of the cone gear 5 as the case may be. The engagement of the gears is influenced by a spring 15 (Fig. 2) one end of which is connected to the sleeve 6 and the other end with the housing 12. The correct approach of the pitch circle of the gear 4 to the pitch circle of the selected gear step of the cone gear 5 is assured in that an abutment plate 16 of the swing frame 3 abuts an adjustable pin 17 arranged in the housing. The number of the pins 17 corresponds with the number of gear steps of the cone gear 5 and the position of the pins with respect to the swing axis depends upon the diameter of the pitch circle of the different steps (see Fig. 4).

A gear 18 is fixedly secured to the sleeve 11 and engages a slidable rack 19 provided in the housing. The rack 19 carries a fork 20 (Fig. 1) which engages an extension 21 of the swing frame 3. If the hand lever 13 is turned (compare Fig. 1) the motion will be transmitted by the sleeve 11, the gear 18 to the rack 19, from there to the fork 20 and the swing frame 3 which will be longitudinally displaced.

The circumference of the handle-like end of sleeve 11 is provided with a number of indentations 22, which correspond in number and in the distances from each other to the different steps of the cone gear 5. The indentations 22 receive the spring-pressed ball 23, which takes care, that during the turning of the lever 13 and the sleeve 11 the latter as well as all the other parts to which the movement of the sleeve is transmitted are positioned in such a manner that during the shifting process the gear 4 is longitudinally exactly opposite the selected gear step of the gear cone 5. The correct position of the lever 13 for every step of the gear drive can be read off on circularly arranged markings 24 provided concentric to the sleeve 11 on the outside of housing (Figs. 2 and 3). The housing 12 is completely closed; the sleeve 11 is arranged in the bore of the housing wall with sufficient tightness to avoid leakage of lubricant and prevent dirt from entering. The shift lever 13 is supported in the sleeve 11 by means of a ball 25 which provides the lever with the required movability and forms a completely leak-proof sealing element.

Figures 6, 7:
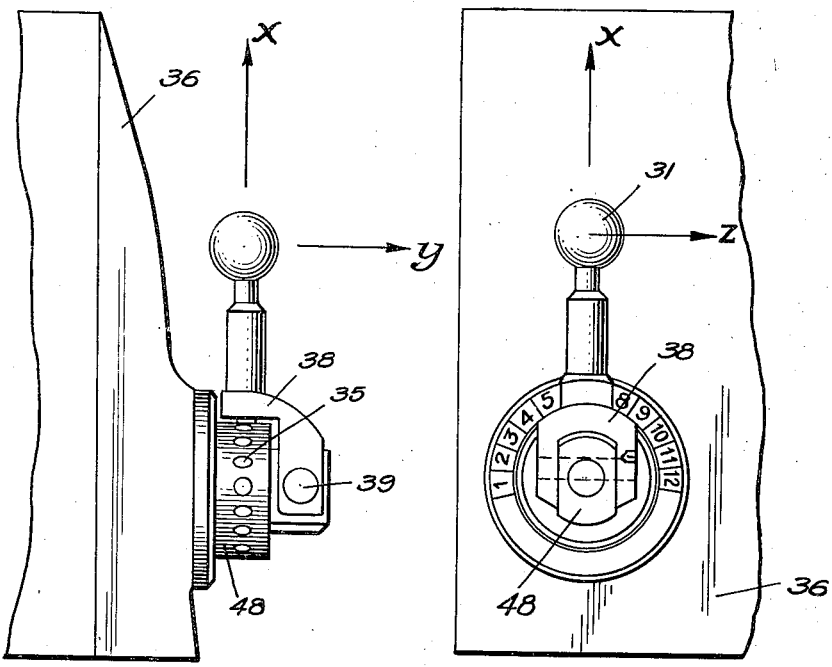
Fig. 6 is an elevational view of the hand lever arrangement.
Fig. 7 is another elevational view of the hand lever arrangement.

In the embodiment of Figs. 5 to 7 the lever 31 (Fig. 5) is arranged in a guide sleeve 32 and may move in an axial direction; a spring 33 urges the lever downward and keeps its lowermost end 34 in notches 35, which are circularly arranged on the circumferential surface of a sleeve 37 fixed to the machine frame 36. By lifting the lever 31 in the direction of the arrow x its lower end 34 is removed from the notch and the lever can be moved in the direction of the arrow y, whereby a lever 38 fixedly secured to the sleeve 32 turns a gear 39, which moves the rack 40 in a transverse direction. A threaded sleeve 41 is rigidly connected with the rack 40 and engages a threaded member 42; this threaded member 42 is integral with a rack 43 which follows the movements of the rack 40. The rack 43 engages a toothed part of the swing member 44 shown on the drawing in dotted lines; the swing member 44 can turn about a shaft 45 and the transmitting gear 46 carried by the swing member 44 may oscillate about this shaft 45 and may be brought in and out of engagement with the gears 47 of the cone gear.

If the hand lever 31 is moved in the direction of the arrow z (Fig. 7) the lever 38 moves also and turns the sleeve 48. A gear 49 is secured to the sleeve 48 (Fig. 5) and engages a rack 50 which is moved in a longitudinal direction by said gear. The rack 50 moves the swing member 44 by means of a fork 51 (shown in dotted lines) and consequently the gear 46 until it opposes the selected gear step. The motion of the hand lever 31 in the direction of the arrow z (Fig. 7) causes a simultaneous rotary motion of the threaded sleeve 41 with regard to the spindle 42; as the rack 43 by virtue of his engagement with the gear 45 prevents the spindle 42 from turning an additional longitudinal displacement of the rack 43 takes place and consequently an additional oscillatory motion of the swing member 44, so that the transmitting gear 46 remains in close proximity of the gear step of the cone gear, this position corresponds to the notch 35 (Fig. 6) into which the lever 31 shall be inserted.

As soon as the hand lever 31 (Fig. 5) is returned in its vertical position and is inserted into a certain notch 35, the actual oscillatory motion is simultaneously imparted to the swing member 44 by means of the rack 43, the threaded connection 41, 42, the rack 40 and the gear 39, thus bringing the transmitting gear 46 in engagement with the selected gear cone for which this notch 35 is provided.

This new shifting device adds to the motion of the hand lever 31, which causes a lateral displacement of the transmitting gear 46 alongside the cone gear unit a second motion which is brought forth by the action of the screw drive 41, 42; the purpose of this second motion is to adjust the position of the transmitting gear 46 to the different steps of the cone gear, so that the transmitting gear remains always in close proximity of the cone gear unit.

In the embodiment of Figs. 5 to 7 it was assumed that the diameters of the different pitch circles decrease uniformly, so that all engagement positions of the gear 46 fall on a straight line and accordingly the drive 41, 42 which causes the additional motion can be a screw drive. i. e. a drive with a uniform pitch. In other cases the helical line of the drive 41, 42 must be substituted by a curve with its pitch changing in a manner corresponding to the curved line on which the engaging positions of the gear 46 with the gear steps are located. In both cases, the notches 35 for the shift lever 41 remain in the same plane which advantageously is arranged vertically to the axis of the sleeve 48. The advantages of such an arrangement are the simplified manufacture of the sleeve 48 with the notches and that the operator can locate the notches much easier.

Figure 8:
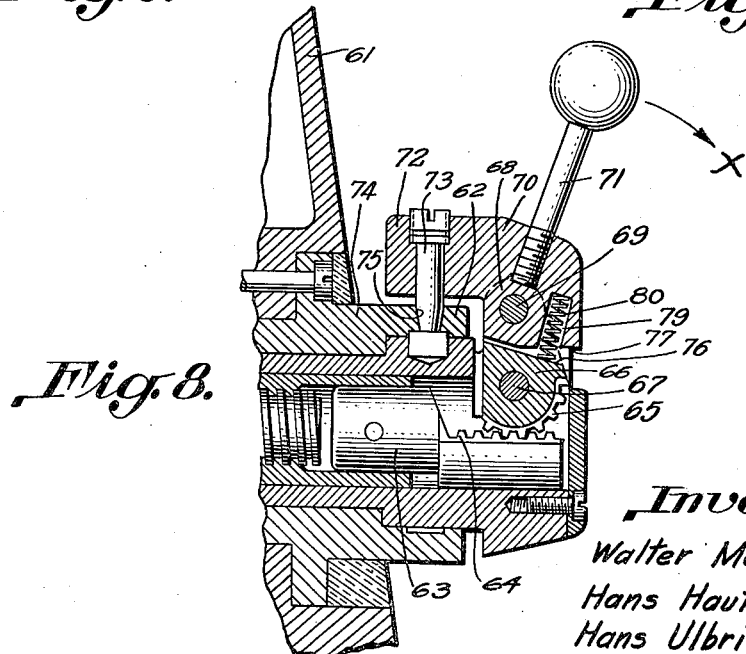
Fig. 8 shows a longitudinal central vertical cross-section of another embodiment.

Another embodiment of the invention is shown on the drawing in Fig. 8 and described as follows:

The gear drive housing 61 supports a sleeve 62 which can rotate about its axis; a shift member 63 movable in a longitudinal direction is provided within said sleeve and this shift member imparts over a rack and a gear an oscillatory motion to a swing member carrying a transmitting gear, these parts are not shown on the drawing. The outer end of the movable shift member 63 carries a rack 64 which is in engagement with a gear segment 65 of a lever 66, pivotally mounted on a bolt 67 in the housing 61. In the upper fork-shaped part 68 of the lever 66 is a lever 70 pivotally mounted on a bolt 69 and integral with the hand lever 71. The extension 72 of lever 70 carries a lock bolt 73 the lower end of which extends from the underside of the extension 72 downward and is slightly conical. Within the operating range of the lock bolt 73 a number of conical apertures 75 are provided in a sleeve 74 connected with the housing 61; the number and the positions of the apertures correspond with the different steps of the stepped gear drive. The lever 70 has a slanting surface 77 opposite the upper surface 76 of the lever 66, both surfaces form together an acute angle of a certain size. The lever 70 is provided with a bore 79 for a spring 80 which presses against the surface 76 of the lever 66.

If the shift lever is in a position as shown on the drawing in full lines the locking bolt 73 engages one of the notches 75. The tension of the spring holds the bolt 73 and the lever 70 in this position. When the speed of the operating shaft of the drive shall be changed by shifting the transmitting gear, the hand lever 71 is somewhat swung out in the direction of the arrow $x$ and in the plane where the cross-section shown on the drawing is taken; the lever 71 is swung out until the surfaces 76 and 77 abut each other. Thereby the spring 80 is pressed together, the locking bolt 73 is removed from the aperture and the locking of the existing shift position is ended. If the hand lever 71 is moved further in the direction of the arrow $x$ the slidable member 63 is displaced in a longitudinal direction and causes an oscillatory motion of the swing member carrying the transmitting gear while the longitudinal displacement of this swing member is accomplished by moving the hand lever in a direction transverse to the plane of the drawing.

We claim:

1. A gear shift mechanism for machine tools comprising a driving shaft, a stepped gear connected to a driven shaft, a transmitting gear between said shaft and stepped gear, means mounting said transmitting gear in continual contact with said driving shaft and with both gyratory and longitudinal movement thereof; a shifting rod, a shifting lever, means connecting said lever to said rod for longitudinally displacing said rod upon movement of said lever in a first direction and for rotating said rod upon movement of said lever in a second direction, and gear means joining said rod to said mounting means for initially gyrating said gear mounting means upon movement of said lever in said first direction and then further gyrating and simultaneously moving said mounting means longitudinally of said driving shaft upon movement of said lever in said second direction.

2. A gear shifting mechanism as in claim 1, further comprising means for selectively locking said lever in positions corresponding to the position of said transmitting gear when engaged with said stepped gear.

3. A gear shifting mechanism as in claim 1, further comprising means for selectively locking said lever in positions corresponding to the position of said transmitting gear when engaged with said stepped gear, and said means connecting said lever to said rod comprising means for moving said rod longitudinally upon operation of said locking means.

WALTER MÖBIUS.
HANS HAUTSCH.
HANS ULBRICH.